United States Patent [19]

Puente

[11] 3,818,348

[45] June 18, 1974

[54] UNIQUE WORD DETECTION IN DIGITAL BURST COMMUNICATION SYSTEMS

[75] Inventor: John G. Puente, Rockville, Md.

[73] Assignee: Communications Satellite Corporation, Washington, D.C.

[22] Filed: May 17, 1971

[21] Appl. No.: 144,173

[52] U.S. Cl. .................. 325/324, 325/325, 235/181

[51] Int. Cl. .............................................. H04b 1/10

[58] Field of Search .......... 178/DIG. 3; 179/15 BW; 325/38 B, 38 R, 321, 324, 42, 65, 474–476, 322, 325; 332/11 D; 324/776 J; 333/70 T; 343/100 CL; 340/146.1 AJ, 146.1 D, 146.1 E; 235/181

[56] References Cited

UNITED STATES PATENTS

| | | | |
|---|---|---|---|
| 2,701,274 | 2/1955 | Oliver | 333/70 T |
| 2,991,422 | 7/1961 | Yaeger | 325/321 |
| 3,155,912 | 11/1964 | Applebaum et al. | 324/77 H |
| 3,174,031 | 3/1965 | Hartmanis et al. | 235/181 |
| 3,292,110 | 12/1966 | Becker et al. | 333/70 T |
| 3,382,438 | 5/1968 | Geller | 325/38 R |
| 3,633,170 | 1/1972 | Jones | 325/38 B |

*Primary Examiner*—Albert J. Mayer
*Attorney, Agent, or Firm*—Sughrue, Rothwell, Mion, Zinn & MacPeak

[57] ABSTRACT

A correlator for detecting unique words in satellite communications systems operating in a burst communications mode variably weights the bits in the unique word inversely to the probability of bit error in the received unique word. The probability of bit error is greater for bits at the front end of the unique word because they may occur before the receiver circuits lock onto the received burst. Consequently, according to the weighting scheme the bits at the front end of the unique word are assigned weighting functions which are less than those assigned to the bits at the rear end of the unique word.

4 Claims, 5 Drawing Figures

INVENTOR
JOHN G. PUENTE
BY Sughrue, Rothwell, Mion, Zinn & Macpeak
ATTORNEYS

UNIQUE WORD DETECTION IN DIGITAL BURST COMMUNICATION SYSTEMS

BACKGROUND OF THE INVENTION

The invention is in the field of unique digital word detection systems and methods.

In certain types of known satellite communications systems information is transmitted and received in asynchronous bursts. Each earth station transmits only for a certain period of time during each 125 $\mu$ sec frame. The transmit time is the burst time and the data transmitted is usually known as the burst. Each burst typically includes a preamble followed by a plurality of data channels carrying information, such as digitally coded speech, destined for various other earth stations. The preamble contains signalling and identification data as well as synchronizing signals to enable the receiver to lock onto the carrier and the bit timing.

An important part of every preamble is the unique word which comprises a series of bits in a particular code. The unique word serves several functions. It uniquely identifies the transmitting station. It allows location of the first bit of the information portion of the burst. It also removes phase ambiguity caused by phase locked loops in the coherent PSK (phase shift key) demodulators.

The problems encountered in the accurate detection of unique words are due to the fact that noise will cause bit errors in the word. Consequently unique word detectors are designed with the intention of providing the lowest probability of missing the correct identification of a unique word and the lowest probability of falsely identifying unique words. These criteria are known respectively as miss detection probability and false detection probability.

Typically the detectors are correlators which individually correlate the received series of bits with stored representations of each unique word representing the several stations in the communications network. All of the unique words taken together are known as the set of unique words for the communications network. Although, as indicated above, the detectors are designed with the intention of achieving low probabilities of miss detection and false detection, actually the effort to reduce these probabilities has been in the selection of the set of words. The objects, stated somewhat superficially in non-statistical terms, has been to derive sets of unique words comprising individual words which are sufficiently different from one another so that a relatively large number of bit errors can be tolerated before any one word becomes too similar to another word. The problem of selection is easier for longer words and fewer words per set, but a large number of words per set is necessary to accommodate a large number of stations, and economics requires the entire preamble to be as short as possible.

Thus far in all of the work and anaylsis in selecting optimum sets of unique words, it has been assumed that the probability of bit error is equal for each bit of the received uinque word. Therefore unique word correlators have always been designed giving each bit equal weight in the correlation detector.

SUMMARY OF THE INVENTION

In asynchronous burst communications systems each new burst must be locked in synchronism to a carrier reference and bit timing reference at the receiver before coherent demodulation and detection can be successfully accomplished. The bit error rate is determined by the carrier-to-noise ratio (C/N), or equivalently the received energy per bit-to-noise density per cycle (E/N). In practice the synchronization information is transmitted at the start of the preamble and time is required before the receiver reference circuits have settled down and are locked. Consequently a curve of probability of bit error versus time from the beginning of burst reception is very high at the beginning of the burst and decreases asymptomatically towards a substantially constant level. With the front end of the unique word occurring in time with a relatively higher $P_{BE}$ (probability of bit error), the correlator detector is designed to give greater weight to the bits at the back end of the unique word. Stated simply, since there is a greater likelihood of error in bits at the beginning of the unique word as compared to bits at the end of the unique word, the bits at the beginning are not treated with the same importance as those which arrive later. This assignment of relative importance is accomplished by relatively weighing the bits inversely to the $P_{BE}$ for the bit position occupied by the bits.

DETAILED DESCRIPTION OF THE DRAWINGS

Figures 1, 2:
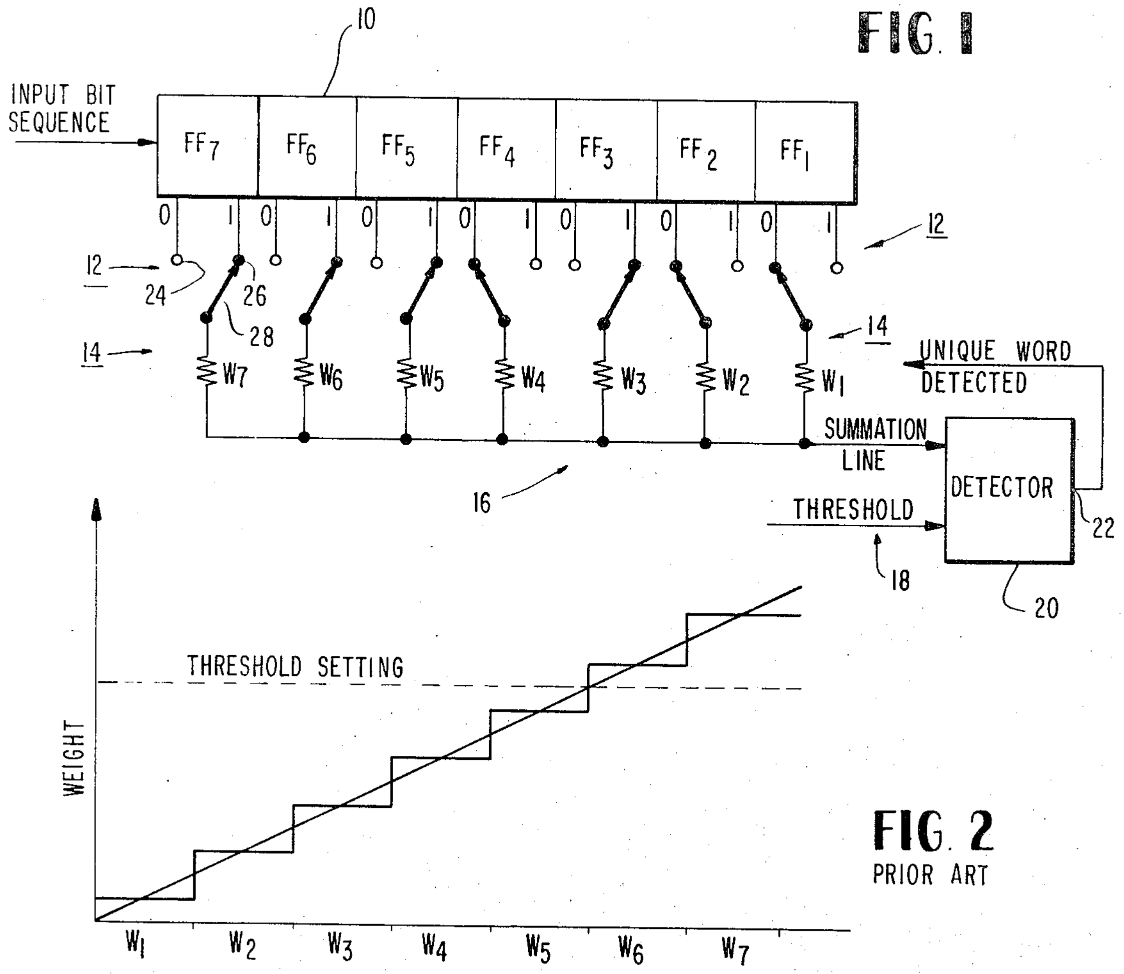
FIG. 1 is a partial block diagram, partial schematic diagram of one implementation of a correlator for detecting a unique word.
FIG. 2 is a graph illustrating the relative values of the weighting functions in a prior art correlator.

In the ground station receiver of a communications satellite network, the output bit sequence from the demodulator is applied to a plurality of correlators — one for each unique word to be detected. Each correlator stores a different unique word for comparison with the received bit sequence, but in other respects all of the correlators are substantially identical. An example of a suitable correlator is illustrated in FIG. 1. A means, such as shift register 10, receives said bit sequence and translates each sequence of *n* bits, into parallel form, where *n* is the number of bits in the unique word. In the specific example shown, $n$=7 and the received sequence of *n* bits is represented by the states of the seven flip flop circuits $FF_1$ through $FF_7$. It will be apparent that the seven bit parallel word stored in the shift register 10 lasts for only one bit period. Each seven bit sequence stored by the shift register 10 is effectively compared with a seven bit unique word which is semi-permanently stored by a unique word storage means 12. In the example illustrated the unique word is 1110100 and storage is provided by separate switching circuits connected to each flip flop circuit. Each said separate switching circuit comprises the 0 and 1 output terminals, 24 and 26, of the associated flip flop circuit and a movable switch arm 28. Storage of a 0 bit is accomplished by connecting arm 28 to terminal 24 whereas storage of a 1 bit is accomplished by connecting arm 28 to terminal 26.

Although any bilevel voltage arrangement on the flip flop outputs would be suitable, it is assumed in connection with FIG. 1, that the two levels of output voltage are 0*v* and +1*v*, with the +1*v* level appearing at the terminal which corresponds to the bit presently stored in the flip flop circuit. Thus, if the bit presently stored in the flip flop circuit is the same as the bit of the unique word stored by the associated switching circuit, 24, 26, 28, a voltage of +1 volts will appear at switch arm 28. The other ends of switch arms 28 are connected respectively to a means, 14, for individually weighing the bits of the unique word. In the case shown, the means 14 comprises resistors $W_1$ through $W_7$, each of which is connected at one end to a switch arm 28 and at the other end to a common summation line 16 where current summation takes place. It will be apparent that the current supplied to the summation line by each stage depends upon the result of the bit comparison and the value of the associated resistance.

A detector 20 compares the current level on line 16 with a threshold level on line 18 and provides a positive indication that the unique word 1110100 has been detected when the threshold level is surpassed by the current level on line 16.

The admittance values of resistors $W_1$ - $W_7$ may be considered as the weighting functions in FIG. 1 and, as explained above, all weighting functions in the prior art correlators were identical. A graph illustrating the prior art condition is shown in FIG. 2. The seven steps of line 23 correspond to the current total on the summation line 16 for one through seven bit identities. Since the weighting function for every bit is the same, an identity between received bit and unique word bit for each bit position adds the same value of current to the current total. Thus for the threshold level illustrated in FIG. 2, an identity between any six bits of the unique word and the received bits stored in the corresponding stages of register 10 will result in a current level on line 16 which surpasses the threshold. All bit positions of the unique word therefore have equal importance determining the detection of the unique word.

However, in practice, the probability of bit error, $P_{BE}$, is greater for the bits in the early part of the unique word than for the bits in the back part of the unique word.

Figure 3:
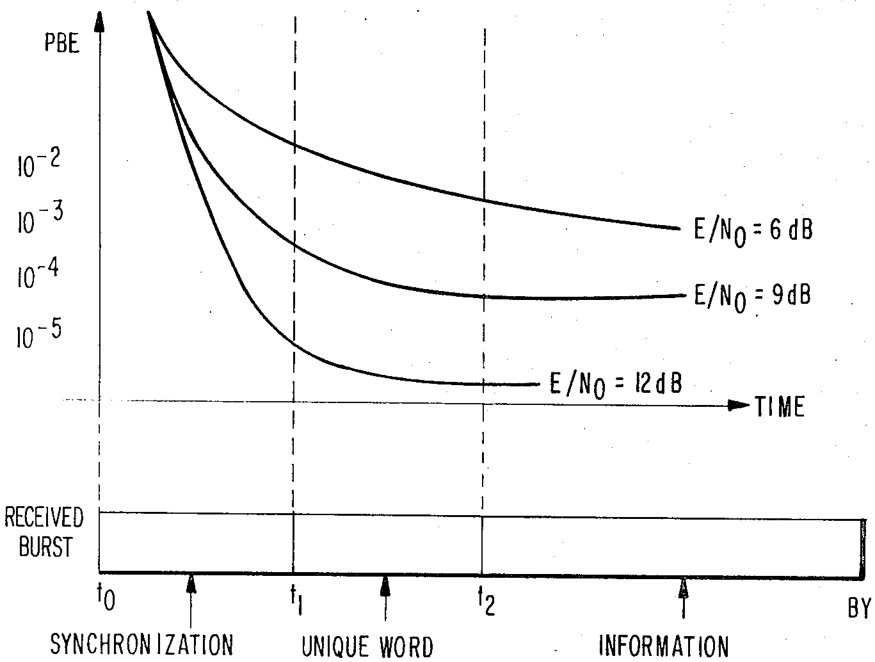
FIG. 3 is a graph illustrating the manner in which the probability of bit error decreases with time from the beginning of the burst.

FIG. 3 illustrates three curves of $P_{BE}$ versus time from the beginning of a received burst. The three different curves are for three systems having different minimum values for the ratio of energy per bit to noise density per cycle. The time $t_0$ represents the beginning of burst reception. As pointed out above, the first part of the burst includes carrier and bit timing synchronization. Since the circuits in the receiver do not lock onto the carrier and bit timing instantaneously, it is apparent that the probability of bit error is greatest at the beginning of the burst and decreases with until it reaches some leveling off point when the receiver circuits are locked onto the carrier and bit timing. It can be seen from the graph, that if the unique word began at time $t_1$, the earlier bits in the unique word will have a higher probability of error than the later bits of unique word. Stated otherwise, there is a greater likelihood that the earlier bits will be in error. The beginning of the unique word could be delayed until the probability of bit error levels off at time $t_2$, but the ecomomics of satellite communications is such that the unique word should terminate as near to the beginning of the burst as is possible without sacrificing detection ability.

Figure 4:
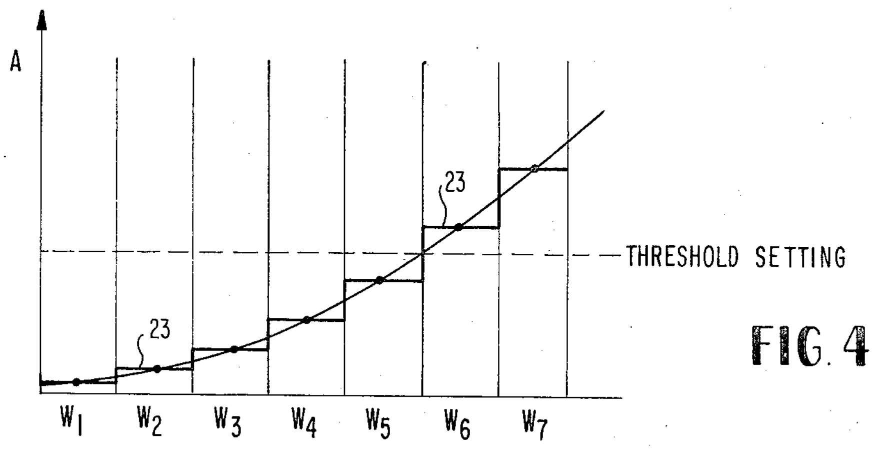
FIG. 4 is a graph illustrating the relative values of the correlator weighting functions in accordance with the present invention.

In accordance with the present invention, the correlator is designed to vary the weighting functions associated with the bits of the unique word in an inverse relation to the probability of bit error. Thus, the bits near the beginning of the unique word having a relatively high probability of bit error will be assigned low weighting functions whereas the bits nearer the end of the unique word will be assigned higher weighting functions. This can be accomplished in the embodiment shown in FIG. 1 by simply providing weighting functions (e.g. admittances) having relative values such as that indicated in FIG. 4. It will be noted from FIG. 4 that the weighting function $W_7$ for the last bit in the unique word is the largest whereas the waiting function $W_1$ for the first bit in the unique word is the smallest.

Figure 5:
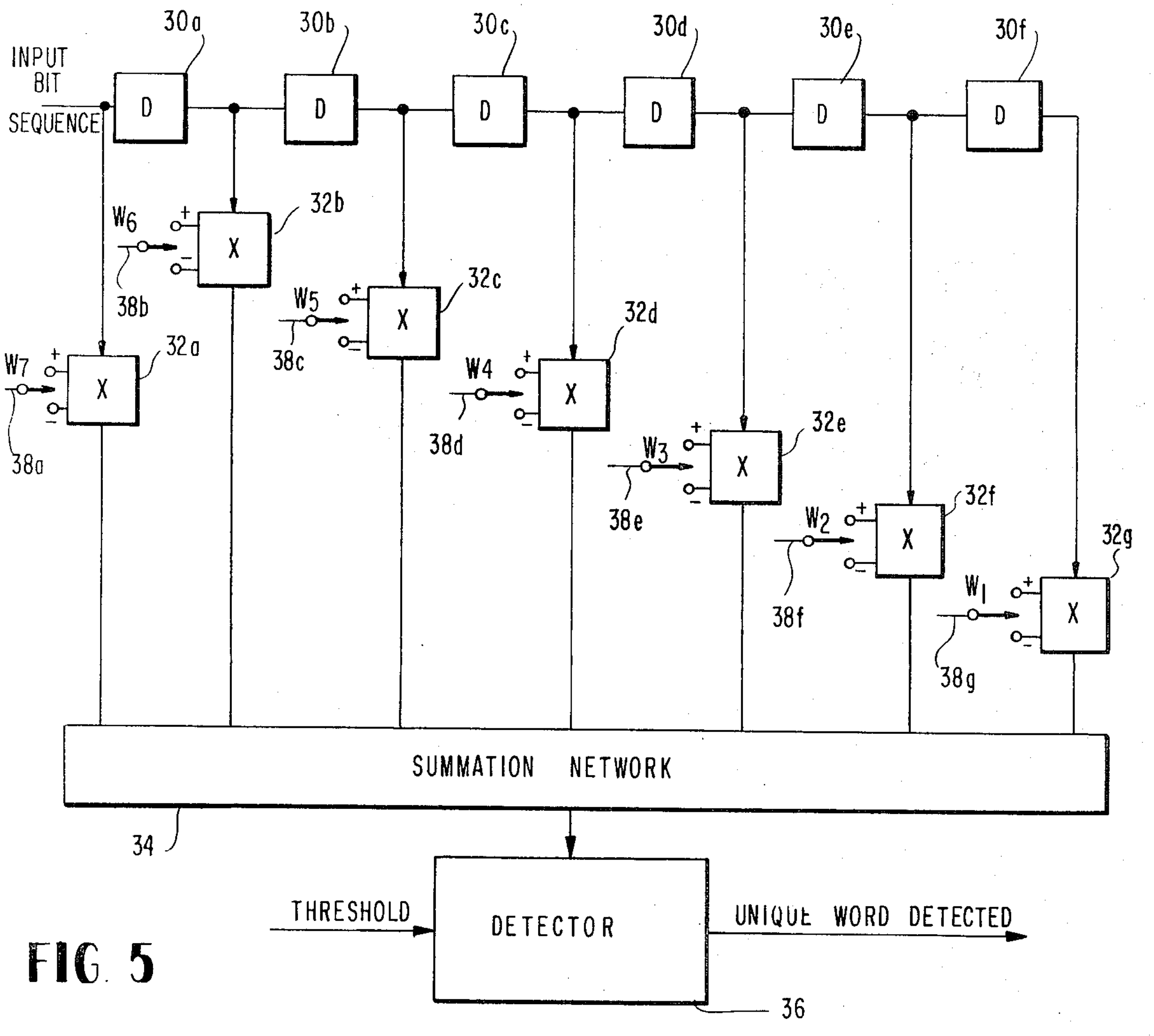
FIG. 5 is a block diagram of an alternate implementation of a correlator for use in detecting a unique word.

An alternate implementation of a unique word correlator is illustrated in FIG. 5. It is assumed for the purposes of explanation that 1 bits on the input lines have a unit value magnitude and a postive polarity whereas the 0 bits have a unit value magnitude and negative polarity. The bit sequence is passed to a series of delay units 30*a* through 30*f*, each of which results in a delay time corresponding to the bit period. The weighting functions $W_1$ through $W_7$ are determined by the magnitude of the currents or voltages applied to the lines 38*a* through 38*g*, and the storage of the unique word is accomplished by selectively connecting the weighting function to the positive or negative input terminal of the associated multiplier 32*a* through 32*g*. If the received bit corresponds to the stored bit, the polarities of the received bit and the stored weighting function will be the same resulting in an output from the associated multiplier having a positive polarity and a magnitude corresponding to the weighting function. If on the other hand, the received bit is the opposite of the stored bit, the output from the multiplier will have a negative value. The outputs from multipliers 32*a* and 32*g* are applied to a summation network whose output is then applied as one input to the detector 36. The other input to the detector 36 is the threshold level and an output therefrom indicates that a unique word has been detected.

What is claimed is:

1. A correlation detector for detecting the reception of a unique series of bits, said detector being the type which includes a means for generating a plurality of weighting functions, one for each bit in the received series which is the same as the corresponding bit of said unique series, a means to sum said weighting functions, and a means for generating a detection signal signifying the valid detection of said unique series when the sum from said summing means exceeds a predetermined threshold level that allows for errors in the received weries of bits, wherein the improvement comprises means for providing weighting functions for the bits at the beginning of said sequence which are less than the weighting functions provided for bits nearer the end of said sequence.

2. A correlation detector for detecting the reception of a unique series of bits, said detector being the type which includes a means for generating a plurality of weighting functions, one for each bit in the received series which is the same as the corresponding bit of said unique series, a means to sum said weighting functions and a means for generating a detection signal signifying the valid detection of said unique series when the sum from said summing means exceeds a predetermined threshold level that allows for errors in the received series of bits, wherein the improvement comprises means for providing weighting functions for the bits in said unique series which are inversely related to the probability of bit error for each said bit.

3. In a receiver adapted to receive burst communications containing synchronizing data followed by a unique series of bits having a probability of bit error which is greater at the time of reception of the first bit of said unique series than at the time of reception of the last bit of said series, a unique word detector comprising:

a. shift register means comprising a number of stages equal to the number of bits in said unique series of bits, each stage of said shift register having a 0 and 1 output terminal and providing a first signal on the particular output terminal which represents the value of the bit presently in said shift register, b. a plurality of switches equal in number to said stages, each said switch having one end connected respectively to one of the two output terminals of a corresponding stage of said shift register, the combination of connections of all said switches representing a stored replica of said unique series of bits, c. a plurality of resistors, one connected to each of said switches at the other end of said switches, the values of said resistors connected through said switches to stages of said shift register nearest the input end of said shift register being less than the values of said resistors connected through said switches to stages of said shift register farthest from the input end of said shift register, all of said resistors being connected together at their ends which are not connected to said switches, d. detector means for providing an output signal when the amplitude of a signal applied to a first input terminal exceeds the amplitude of a signal applied to a second input terminal thereof, the common connection of the ends of said resistors being connected to said first input terminal, and e. means for applying a fixed amplitude signal to said second input terminal.

4. A unique word detector as claimed in claim 3 wherein said resistors have relative values which are in direct relation to the probability of bit error for the respective bits of the unique word represented by the connections of the respective switches connected to said resistors.

* * * * *

UNITED STATES PATENT OFFICE

CERTIFICATE OF CORRECTION

Patent No. 3,818,348 Dated June 18, 1974

Inventor(s) John G. Puente

It is certified that error appears in the above-identified patent and that said Letters Patent are hereby corrected as shown below:

IN THE SPECIFICATION

Column 3, line 59 - after "with" insert -- time --

Column 4, line 18 - "waiting function $W_1$" should be --weighting function $W_1$ --

IN THE CLAIMS

Column 4, line 59 - delete "weries" and insert -- series--

Signed and sealed this 19th day of November 1974.

(SEAL)
Attest:

McCOY M. GIBSON JR.
Attesting Officer

C. MARSHALL DANN
Commissioner of Patents